United States Patent

[11] 3,623,564

| [72] | Inventor | William W. Higginbotham<br>Monroe, Mich. |
|---|---|---|
| [21] | Appl. No. | 872,992 |
| [22] | Filed | Oct. 31, 1969 |
| [45] | Patented | Nov. 30, 1971 |
| [73] | Assignee | Monroe Auto Equipment Company<br>Monroe, Mich. |

[54] SNOW VEHICLE FRONT SUSPENSION
12 Claims, 4 Drawing Figs.

[52] U.S. Cl. .................................................. 180/5 R,
280/25
[51] Int. Cl. .................................................. B62m 27/02,
B62b 17/04
[50] Field of Search .......................................... 180/3–6;
280/9, 10, 11, 12, 16, 17, 21, 25, 26; 244/108

[56] References Cited
UNITED STATES PATENTS

| 1,891,188 | 12/1932 | Stalb | 244/108 |
| 1,892,064 | 12/1932 | Markey | 244/108 |
| 2,223,834 | 12/1940 | Seltenreich | 244/108 |
| 2,700,427 | 1/1955 | Schomers | 244/108 |
| 3,023,824 | 3/1962 | Bombardier | 180/5 X |
| 3,166,338 | 1/1965 | Romsdal | 280/21 |

Primary Examiner—Richard J. Johnson
Attorney—Harness, Dickey & Pierce

ABSTRACT: A ski-mounting assembly for snow vehicles and the like comprising a conventional shock absorber and a rigid arm member disposed longitudinally in line with each other above the ski, the shock absorber and the arm members being connected at the outer ends thereof to the ski by fixed pivots, and being interconnected at the inner ends thereof by a movable pivot, the shock absorber and the arm member extending angularly upwardly toward each other from the fixed pivots at a relatively flat angle with respect to the ski, the arm member being supported by a coil spring preferably disposed substantially at the center of the ski, and means being provided on the arm member preferably directly over the spring for attaching the assembly to the snow vehicle.

PATENTED NOV 30 1971 3,623,564

INVENTOR
William W. Higginbotham
BY
Harness, Dickey & Pierce
ATTORNEYS

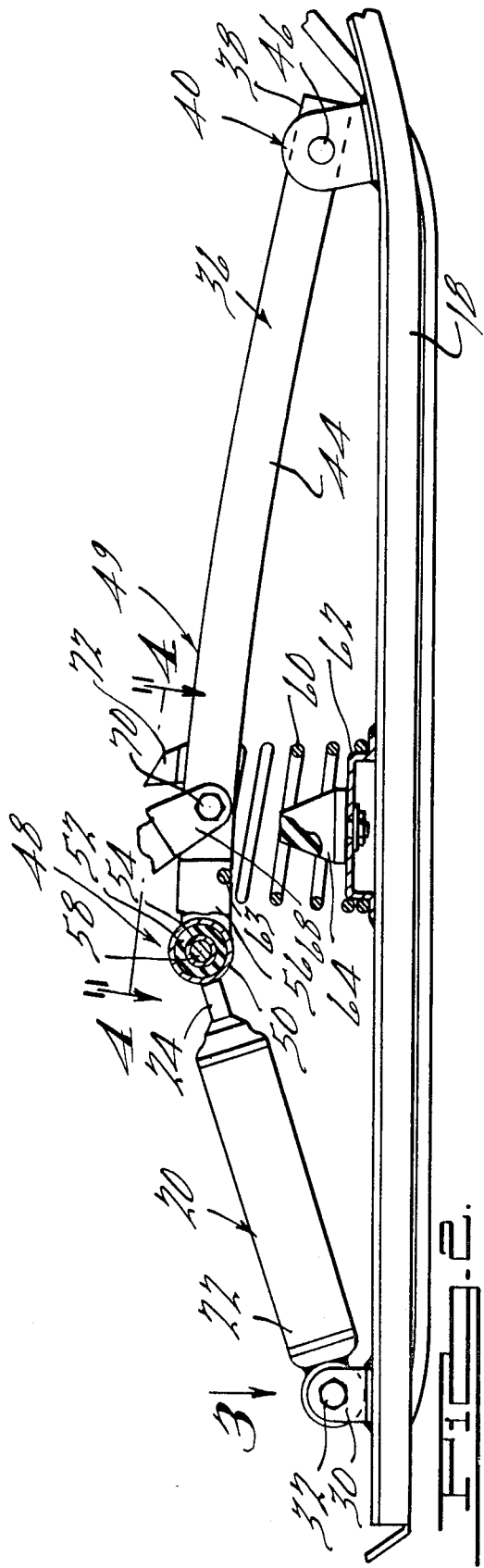
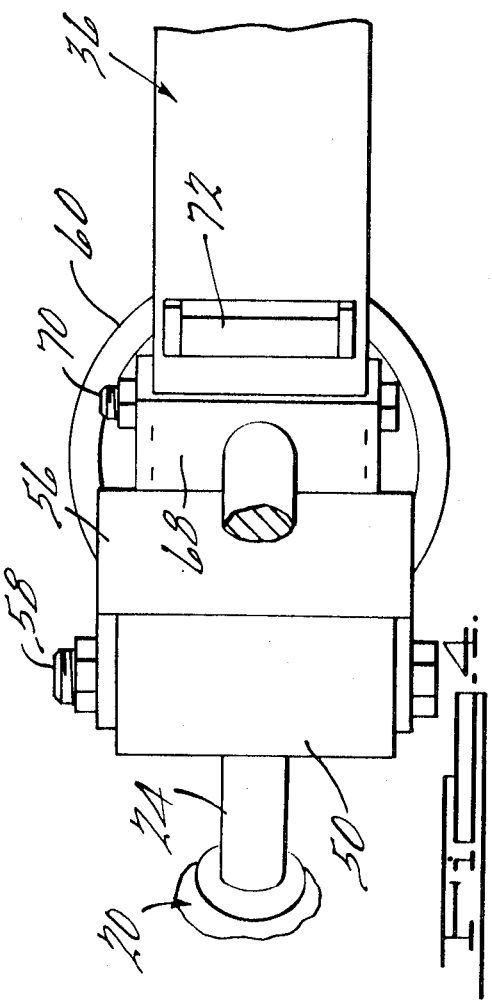

3,623,564

SNOW VEHICLE FRONT SUSPENSION

BACKGROUND OF THE INVENTION

In conventional practice, the front end of a snow vehicle is provided with two parallel, laterally spaced, steerable skis; and road shocks are sustained and absorbed by longitudinal leaf springs mounted on and carried by the skis and attached to the steering shafts. Manifestly, the relative stiffness of the leaf springs and their rate of deflection directly affects and determines the ride characteristics of the vehicle; and the manner in which the springs rebound from shock loads affects not only the ride but also the steering and control of the vehicle in use. These vehicles are designed and intended to travel crosscountry over rough terrain at relatively high speeds; and it has been necessary therefor to use relatively stiff, high rate springs in order to prevent overstressing of the springs under shock loads and to absorb impact stresses encountered in use. Also, the rebound characteristics of essentially stiff leaf springs of the type required and heretofore used sometimes tend to flip the vehicle over under certain operating conditions. Another disadvantage of the conventional mounting is that the leaf springs tend, under certain conditions of use, to develop a harmonic vibration resulting in rhythmic, pulsating up and down movement of the skis which in turn causes the latter to beat against and into the snow. This phenomenon obviously produces a hard jolting ride and also substantially slows the speed of the vehicle. Finally, high frictional resistance to flexure leaf springs also makes for a harder ride.

SUMMARY OF THE INVENTION

The mounting assembly of this invention provides a softer ride, a more controlled rebound, and better steering characteristics. A coil spring having a much lower rate than a comparable leaf spring can be used without danger of overstressing the spring or of the latter taking a permanent set when subjected to shock and heavy impact loads; and this together with the fact that friction present in the conventional leaf spring design is much reduced, results in a softer ride. Moreover, these advantages are obtained without adversely affecting steering of the vehicle. In fact, the combination shock absorber—coil spring mounting of this invention tends to dampen both impact forces against the skis as well as the resultant rebound so that there is less tendency for an obstruction to throw the vehicle or for harmonic vibrations or motions to develop. As a result, better steering and a more controlled ride is achieved. Another factor bearing on the latter advantage is the fact that it is easier to balance the rate characteristics of the coil spring to the particular vehicle. Of significance also is the fact that the shock absorber, when associated with a rigid arm member and in combination with a coil spring in the manner of this invention, provides a low-profile ski mounting that fits readily under the body of the vehicle.

DESCRIPTION OF THE DRAWINGS

FIG. 2 is an enlarged, side elevational view, showing parts broken away and in section for clearness of illustration, of a ski and ski mounting embodying the present invention;

FIG. 4 is an enlarged, fragmentary, plan view taken on the line 4—4 of FIG. 2.

DESCRIPTION OF THE PREFERRED EMBODIMENT

Figure 1:
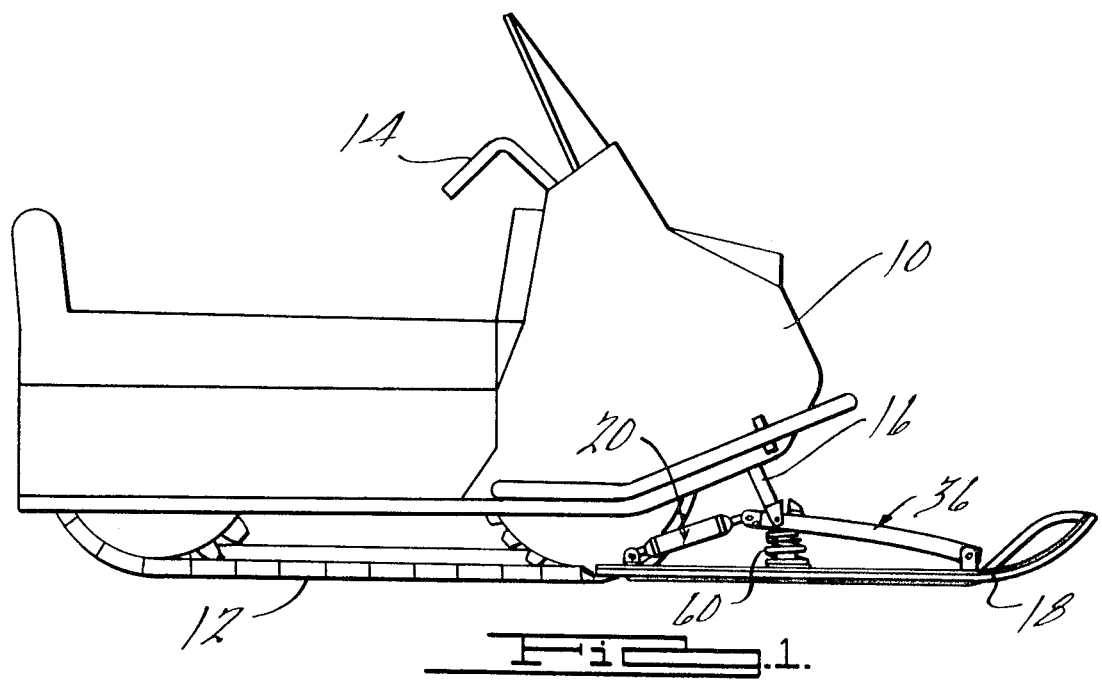
FIG. 1 is a side elevational view of a snow vehicle of the type having skis under the front of the vehicle body and showing a ski mounting embodying the invention associated therewith.
Figure 3:
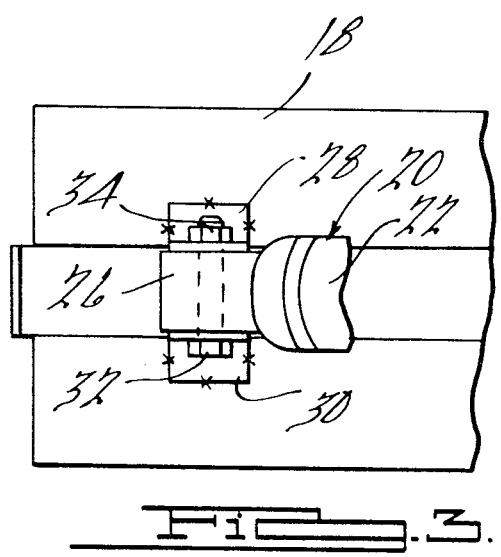
FIG. 3 is an enlarged, fragmentary, top plan view looking in the direction of the arrow 3 in FIG. 2.

Attention is first directed to FIG. 1 which shows a snow vehicle of a generally conventional type having a body 10 mounted over a power driven endless-belt-type of traction drive 12 and the usual steering mechanism which includes handle bars 14 at the front of the body 10 connected by suitable links to steering shafts 16 which extend downwardly from the body and are connected to the usual front runners or skis 18. Although only one steering shaft 16 and one ski 18 is shown in the drawing, it will be understood that the vehicle normally is provided with two skis which are disposed side-by-side in laterally spaced relation under the front end of the body 10 and that each ski is connected to a respective one of two mutually operable, laterally spaced, parallel steering shafts 16. A detailed description of only one ski and its mounting will be given, but it will be understood that both skis are identically mounted and that both are associated in the same manner with the steering shafts 16 and with the body 10.

More particularly, the ski mounting of this invention comprises a shock absorber 10 of the type having a cylindrical body 22 and a piston (not shown) mounted for reciprocation in the body and having a piston rod 24 extending from one end of the cylinder. Any suitable or conventional shock absorber of the type shown that is suitably valved for the purpose at hand can be used; and the one disclosed in the Whisler U.S. Pat. No. Re. 23,421 is a typical example of such a one. In order to adapt the shock absorber 20 for mounting on the ski 18, the rearward or outer end of the cylinder 22 is provided with fixed bushing 26 which extends longitudinally beyond the cylinder and fits snugly between laterally spaced mounting brackets 28 and 30 surmounting and welded or otherwise permanently and securely affixed to the ski 18 adjacent the rearward end of the latter. A bolt 32 retained by a nut 34 extends between the mounting brackets 28 and 30 and through the bushing 26 to provide a pivot on which the bushing is free to turn, and about which the shock absorber 20 is freely oscillatable.

A rigid arm member 36 is similarly pivotally mounted on the ski 18 at the forward end 38 thereof between the laterally spaced ears of a U-shaped bracket 40 which is welded or otherwise affixed securely to the ski. Any form of arm 36 that is adequately strong and rigid is suitable for the purpose of this invention. The one here shown is formed of rectangular metal tubing which provides an essentially strong, rigid, but lightweight arm structure. When an arm of this type is used, the mounting bracket 40 conveniently may be of generally U-shaped and mounted with the bight portion thereof on and welded to the ski. As suggested, the arm 36 is disposed between the upstanding ears of the bracket 40, and a suitable pivot 46 extending between the ears of the bracket 40 and the sides 44 of the arm 36 journal the forward end of the arm for turning or oscillatory movement about the pivot.

The inner or proximate ends of the shock absorber 20 and of the arm 36 are pivotally interconnected as at 48 to form a load supporting means 49 through which the steering shaft 16 is connected to the ski 18. Both the shock absorber 20 and the arm 36 extend angularly upwardly from their respective pivots 32 and 46 toward each other at a relatively flat angle with respect to the ski 18, and the pivot mounting 48 is free to move vertically relative to the ski as the shock absorber 20 expands and contracts. Thus, the two end pivots 32 and 46 are fixed or stationary at least insofar as the ski 18 is concerned and the intermediate pivot 48 which interconnects the shock absorber and the arm is free to move under shock and impact loads occurring in use. To this end, the pivot connection 48 preferably is rubber bushed to cushion the shock and impact forces. More particularly, the movable pivot 48 here shown comprises a ring-shaped outer casing 50 which is welded for otherwise permanently attached at one side thereof to the end of the piston rod 24. A rubber sleeve or bushing 52 is provided inside the casing 50, and a tubular metal liner 54 is provided in the bushing. All of these members are confined between the ears of a U-shaped bracket 56 on and welded to the adjacent end of the arm 36, and a pivot pin 58 extending between the ears and through the sleeve 54 completes the assembly.

Interposed between the load-supporting means 49 and the ski 18 intermediate the fixed pivots 32 and 46 is a coil spring 60 on the lower end of which is wrapped snugly around a suitable spring and bumper support 62 on and welded to the ski 18 and the upper end of which extends through transverse slots 63 in the bottom edges of the bracket 56. The slots 63 effectively confine and retain the upper end of the spring 60 and, since the spring is normally compressed, they collectively define a neat and inexpensive means for mounting and holding the spring. In use, the spring 60 supports the shock absorber 20 and the arm 36 at a suitable elevation above the ski 18 and it controls to some extent limits oscillatory movement of these members as well as vertical movement of the pivot 48. Disposed on the support 62 substantially centrally thereof and surrounded by the spring 60 is a resilient bumper 64 which is adapted to be engaged by the arm 36 under extreme load conditions or when the spring bottoms whereby to prevent extreme jar under jumping or other extremely severe conditions of use.

The means of attachment between the steering shaft 16 and the load supporting means 49 is here shown in the form of a U-shaped bracket 68 the bight portion of which is welded to the end of the steering shaft 16 and the arm portions of which embrace the arm 36 adjacent to the bracket 56. A pivot 70 carried by and extending between the ears of the bracket 68 and through suitably aligned openings in he sides of the arm 36 interconnect the bracket and the arm. A stop 72 on and welded to the arm 36 in front of the bracket 68 engages the bracket to limit oscillatory movement of the ski in one direction about the pivot 70 and the bracket 56 engages the steering shafts 16 to limit oscillatory movement of the ski in the opposite direction. It is of course necessary that the ski assembly have some rocking or oscillatory movement about the pivot 70 in order to accommodate the ski to the terrain over which the vehicle moves and it is equally necessary that the pivot connection be essentially rugged and sturdy as the ski 18 must turn with the shaft 16 in order to steer the vehicle. In this connection, it will be understood that the particular mode of attachment between the steering shaft 16 and the ski assembly is not critical to the invention and that any suitable or conventional mode of attachment can be used for this purpose.

In practice, the skis 18 move across the ground under front end of the body 10 and shock or impact loads on either ski due to the latter striking and passing over an obstruction or otherwise are absorbed by the joint action of the shock absorber 20 and the spring 60. Under these circumstances, the shock load of course is transmitted upwardly from ski to the vehicle through the load-supporting means 49. The initial impact causes both the shock absorber 20 and the arm 36 to flatten or to move about their respective pivots 32 and 46 in he direction of the ski against the resilient action of the spring 60 and the damping effect of the shock absorber. If the impact is sufficiently great, the arm 36 may even bottom on the bumper 64. It will be readily appreciated, however, that the spring 60 desirably is sufficiently stiff to absorb most loads of this type and that it will yield sufficiently to permit the arm 36 to contact the bumper 64 only under extreme conditions.

A primary advantage of the ski mounting of this invention is that the spring 60 acting in concert with the shock absorber 20 dampens the action of the suspension so as to prevent the occurrence of critical frequency vibration which cause the ski 18 to beat against and to embed in the snow. Also, the improved geometry of the suspension allows the vehicle to go over bumps due to a combination of pivot and lever arm arrangement which provides an equalizer effect. When the front of the ski 18 hits a bump the ski can pivot more or less freely about the pivot 70 until the stop 72 engages the bracket 68. This prevents the ski 18 or any part of the suspension mounting from coming up and striking against the body of the vehicle, similarly, when the rear of the ski hits a bump the ski can rock on the pivot 70 until the bracket stop 56 engages the mounting bracket 68. In both situations, engagement of the stops cause the suspension to flatten out against the action of the spring 60 and in both situations the flattening action is damped by the shock absorber 20 to prevent the undesirable beating effect referred to above. Also, as the ski 18 passes over a bump and the shock load moves progressively from the front to the rear of the ski, the lever arm arrangement provides a varying spring rate and particularly, when the rear end of the ski hits the bump, the lever arm gives a lower rate that inhibits the beating action whereby to assist in preventing the development of critical frequency vibrations, provides a softer ride than the conventional leaf spring mounting. An important contributing factor is the fact that a lower rate spring can be used without being overstressed. In general, a coil spring having a load resistance factor of approximately 75 pounds per square inch is satisfactory. It is desirable that the arm 36 be as long as possible to minimize the arcuate motion of its inner end as the arm rocks in use about the pivot 46. Thus, the arm 36 inevitably is substantially longer than the shock absorber 20. Conceivably, an even shorter shock absorber than the one shown could be used; and, in this event, it would be desirable to mount the shock farther down in the ski channel than is shown in the drawing. Also, it is desirable that the spring mounting 62 be disposed as close as possible to the center of the ski 18 for optimum distribution of weight and stresses occurring in use. The mounting for attaching the assembly to the steering shaft 16 should be directly over the coil spring 60 for maximum stability and ease of turning. The essentially flat angle normally assumed by the shock absorber 20 and the arm 36 provides a low profile or silhouette which permits the assembly to fit easily under the front end of the vehicle body.

I claim:

1. A ski mounting for snow vehicles and the like comprising
   load-supporting means
      including
      a shock absorber,
      a rigid arm member,
      a first fixed pivot mounting
         connecting one end of said shock absorber to said ski member adjacent to end of the latter,
      a second fixed pivot mounting
         connecting one end of said rigid arm member to said ski member adjacent to the other end of the latter, and
      movable pivot means
         interconnecting the other end of said shock absorber and said rigid arm member;
   coil spring means
      interposed between said load supporting means and a seat on said ski member intermediate said first and second fixed pivot mountings and proximate to said movable pivot means; and
   connecting means
      associated with said load-supporting means for use in attaching said ski mounting to a snow vehicle.

2. The combination as set forth in claim 1 including
   means for a ski for supporting and retaining the lower end of said spring,
   and wherein
   the upper end of said spring is confined and retained in recess means in the underside of said load-supporting means.

3. The combination as set forth in claim 1 wherein the end of said spring means which seats on the ski member is disposed at substantially the center of said ski member.

4. The combination as set forth in claim 1 wherein the end of said spring means which seats on the ski member is disposed at substantially the center of said ski member, and wherein said connecting means is mounted on said rigid arm member directly above said spring means, whereby to position said spring normally vertically on said ski.

5. The combination as set forth in claim 1 wherein said rigid arm member extends from said second fixed pivot at a relatively flat angle with respect to said ski member, and wherein said load-supporting means has an essentially low silhouette to minimize the vertical height of the ski-mounting assembly and to facilitate placement thereof under said snow vehicle.

6. The combination as set forth in claim 1 wherein said rigid arm member is relatively longer than said shock absorber.

7. The combination as set forth in claim 6 wherein the end of said spring means which seats on the ski member is disposed at substantially the center of said ski member and relatively closer to said first fixed pivot than to said second fixed pivot.

8. The combination as set forth in claim 1 wherein said spring means is disposed directly under said rigid arm member adjacent to said movable pivot means.

9. The combination as set forth in claim 8 including
a resilient bumper
interposed between said ski member and said rigid arm member and engageable with the latter under extreme load conditions of said spring.

10. The combination as set forth in claim 9 wherein said resilient bumper is disposed inside said spring means and under the end of said rigid arm member adjacent to said movable pivot means.

11. A mounting for the ski of a snow vehicle comprising
load-supporting means
including
a shock absorber,
and
a rigid arm member,
said shock absorber and said rigid arm member being pivotally connected to each other; and
a coil spring
positionable under said load supporting means at substantially the point of pivotal connection between said shock absorber and said rigid arm member, the outer ends of said shock absorber and said rigid arm member adapted for pivotal attachment to said ski with point of pivotal interconnection spaced above the ski so that said point of pivotal interconnection is free to move vertically relative to the ski as the shock absorber expands and contracts in use, and said spring adapted to be interpositioned in a normally vertical position between said load-supporting means and said ski to control vertical movement of said pivotal interconnection.

12. The combination as set forth in claim 11 including
connecting means
affixed to said rigid arm member substantially above the mounting location for said spring and adapted to attach said ski mounting to the body of said snow vehicle.

* * * * *